(No Model.)
C. F. BRUSH.
SECONDARY BATTERY CHARGING.
No. 396,681. Patented Jan. 22, 1889.
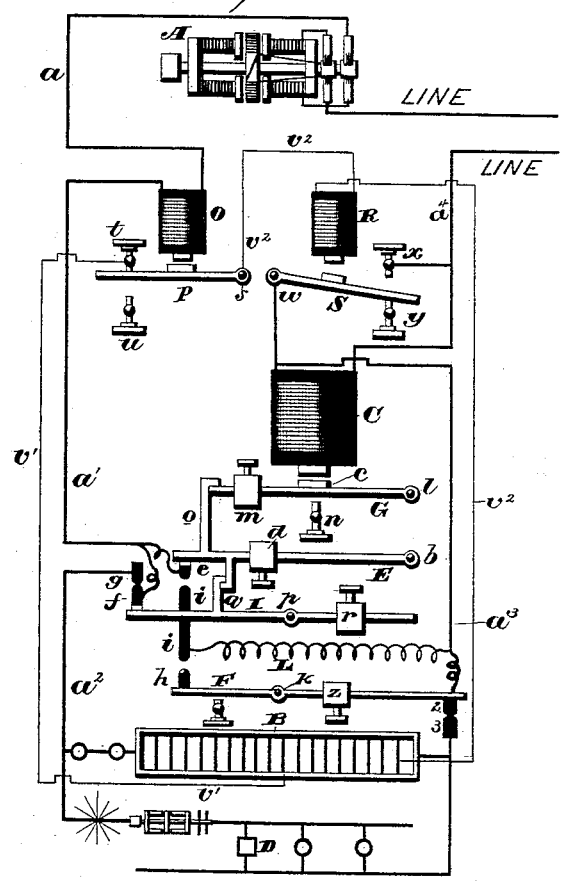
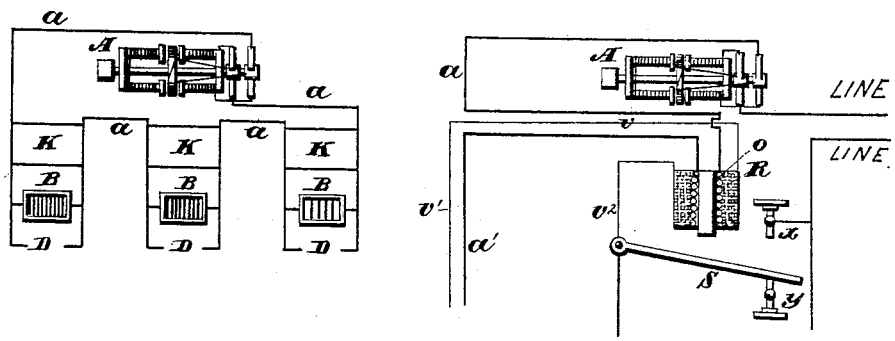
WITNESSES
INVENTOR
Chas. F. Brush.
By Leggett & Leggett
Attorney.

UNITED STATES PATENT OFFICE.

CHARLES F. BRUSH, OF CLEVELAND, OHIO.

SECONDARY-BATTERY CHARGING.

SPECIFICATION forming part of Letters Patent No. 396,681, dated January 22, 1889.

Application filed May 21, 1883. Serial No. 95,602. (No model.)

*To all whom it may concern:*

Be it known that I, CHARLES F. BRUSH, of Cleveland, in the county of Cuyahoga and State of Ohio, have invented certain new and useful Improvements in Devices for Regulating the Charging and Discharging of Secondary Batteries; and I do hereby declare the following to be a full, clear, and exact description of the invention, such as will enable others skilled in the art to which it pertains to make and use the same.

My invention relates to devices for regulating the charging and discharging of secondary batteries; and it consists in devices, hereinafter described, or their equivalent, for automatically manipulating the current employed in charging such batteries. My devices for this purpose are such that, first, when no current is acting the charging-circuit the one or more batteries in connection therewith will be open-circuited, and the latter will be "short-circuited" around each battery; also, second, when the charging-current is fully established in the charging circuit or line the "short circuit" around each battery will be opened and the battery thrown into circuit; also, third, when each battery becomes fully charged it will, independently of any other battery in the charging-circuit, be thrown out of the charging-circuit, and the latter will be short-circuited around the battery as at first; again, when the charging-current stops or becomes greatly lessened, each battery, whether fully charged or not, will be thrown out of circuit and the line short-circuited, as before. These automatic operations prevent the inverse discharge of the batteries through the charging-line when the charging-current is discontinued, prevent reversal of polarity in the dynamo-machine when such is employed for charging, leave a closed circuit for the charging-current to re-establish itself in when recharging or continued charging of the battery is desired, and avoid waste of current energy by stopping the current through a battery when the latter is fully charged.

Other important advantages attend the use of my automatic apparatus, as will appear later in this specification.

My automatic apparatus, although well adapted to control the charging of a single secondary battery, is especially designed to regulate the charging from a single current source of many batteries.

Each battery may consist of any desired number of elements or cells irrespective of the number of elements in any other battery. The several batteries may be charged in "multiple arc," or in "series multiple arc," or in "single series." The latter is the preferable method, and is the one I shall more particularly describe. In order to secure all of the advantages pertaining to my invention, each battery should in either case be provided with my current-controlling device.

I have specified that when a battery becomes fully charged it will be thrown out of the circuit and the latter closed through another channel. This may and generally will occur while the charging-current is in full force. In the performance of this operation it certainly will not do to close the short circuit around the battery before disconnecting the latter from the line, because then the battery would at once commence to discharge itself with very great energy through this short circuit, and the subsequent disconnection of the battery from the line would be attended by the destruction of the parts where the break occurred. On the other hand, the battery could not be entirely disconnected from the charging-line before closing the short circuit, as this would entail the stoppage of the current in the whole system of batteries.

A partial break might be made by establishing an arc at one end of the battery long enough to prevent the discharge of the latter across the interval when the short circuit is established; but this would be very objectionable, not only on account of the burning of the points where the separation occurs, but because of the extra resistance (that of the arc) suddenly introduced into the charging-circuit. Obviously similar difficulties would occur in throwing a battery into the charging-circuit. I avoid these difficulties by using a resistance and by making the operation of throwing a battery out of or into the charging-circuit consist of a series of steps, as follows: In throwing a battery out of circuit the first step consists in the introduction of a resistance parallel with the battery between which and the battery the charging-circuit may divide itself; but I make this resistance so small that substantially the whole of the charging-current passes through it, while at the same time the resistance is great enough, being occupied by the charging-current, to prevent a discharge from the battery through it. The next step disconnects the battery from the line, leaving in lieu thereof the resistance. The third step short-circuits the resistance and completes the operation. Thus a battery may be thrown out of the charging line without any disturbance of the latter's current, and without any sparks whatever if the resistance be carefully adjusted. Even if the resistance is only approximately adjusted the sparks will be small and entirely harmless. In throwing a battery into the charging-circuit these steps are reversed. First the short circuit is opened, throwing the current into the resistance. This will of course be attended by a flash, which, however, is comparatively small and is harmless. This flash may be divided into a number of much smaller ones by introducing successively-increasing resistances; but this is an entirely unnecessary refinement and complication, and I will not again allude to it after stating here that while I prefer to use a single resistance I do not wish to be understood as confining myself to it. The next step connects the battery, and the third and last step opens the resistance, throwing all of the current through the battery. This last step will of course be attended by another flash, which, however, is smaller than the first and quite unimportant. When the charging-current stops or diminishes in the act of stopping or otherwise, then any battery which has not already become fully charged and switched itself out of the circuit will be thrown out by the same series of operations which would have occurred had it been previously fully charged.

In designing and adjusting mechanism I prefer to so arrange matters that the function of throwing the batteries into the charging-circuit, which is exercised when the charging-current is established, shall not be called into action until the charging-current has approximately reached its normal strength. By this precaution I secure an advantage of much importance when a large number of batteries are to be charged. I have neglected to mention that one of the objects of my invention is to provide for the unequal use of the several batteries of a system between or during the times of charging, and here call attention to this point as an aid to my present explanation. I will also add that I contemplate locating the several batteries of my system not necessarily in one place, but at many points, which may be widely separated, to the end that the batteries may be independently employed in different buildings or localities for lighting or other purposes, all the batteries being connected by the charging-line. Suppose, now, that we have a hundred or more batteries connected with one charging-line, and that the dynamo-machine used for charging is capable of simultaneously charging, say, twenty batteries only. Suppose, also, that the hundred batteries have been unequally exhausted since the last time of charging. Now, since it would be impossible to so adjust the automatic devices pertaining to the several batteries that the latter would all be thrown into the circuit by the same strength of current, it follows that as the charging-machine is set in motion and the charging-current approaches normal strength first one battery (that whose current-regulating device responds to the least current) will be thrown into circuit, then another, and so on until any further increase of current will be prevented by the opposing electro-motive force of the batteries already in circuit. We will now have, say, twenty batteries in circuit, and these will continue to receive the charge until one or more of them (those of the twenty which have been least exhausted since the previous time of charging) become fully charged and are thrown out of circuit and the line short-circuited around them. This will slightly increase the charging-current, owing to the decrease of resistance in the line, and one or more new batteries will be thrown into the circuit until increase of current is checked, as before. Thus the whole hundred batteries will in time become charged, an automatic current-regulator at the dynamo-machine preventing undue increase of current when the last twenty batteries are one after another thrown out of circuit. When the last twenty batteries on the line begin to cut out, which may be known by the action of the current-regulator at the charging-machine, another line of discharged or partially-discharged batteries may be switched into the circuit, and when it is deemed that the remaining batteries of the first line have finished charging this line may be switched out of circuit. Thus it will be seen that one charging-machine may be made to charge an indefinite number of secondary batteries, the number depending only on the initial capacity of the machine, the length of time it is run, and the amount of charge used from the batteries. It will also be seen that the various batteries of an extended system may be used little or much, discharging a small or large current continuously or at irregular intervals, while the operation of recharging is under perfect and automatic control, and no current energy is wasted in overcharging any battery.

In the drawings, Figure 1 illustrates one convenient form of apparatus embodying my invention. Fig. 2 represents a system of secondary batteries all charged from one line, each battery being provided with a current-manipulator. Fig. 3 shows a combination or compound arrangement of the magnets O and R, Fig. 1.

In Fig. 1, A represents a current-generator, which may consist of a dynamo or magneto-electric machine or other apparatus capable of furnishing a suitable current.

B is a secondary battery.

C is an electro-magnet located in the circuit $a\ a'\ a^2\ a^3\ a^4$, connecting the generator and battery.

D represents a number of electric lamps, electric motors, or other electro-receptive devices.

E is a lever pivoted at $b$. This lever may be provided with an adjustable weight, $d$, if desired. The free end of the lever E carries a contact-point, $e$, which is connected by a flexible conductor or otherwise with the charging-line $a'$. G is another lever pivoted at $e$ and provided with an armature, $c$, facing the pole or poles of the magnet C. This lever may be of iron and the armature $c$ dispensed with. The lever G may be provided with an adjustable weight, $m$, if desired.

$n$ is an adjustable stop limiting the downward motion of the lever G. By means of an arm, $o$, attached to the lever E, and which engages with the lever G after the latter has commenced to rise in obedience to the attraction of the magnet C, the lever E is also raised.

I is a lever pivoted at $p$ and connected by catches $q$ (or an equivalent link) with the lever E in such a manner that I is held up by E when the latter rises, while E may fall independently of I. The lever I carries contact-points $f\ i$, which are insulated from each other. The lever I also carries a counterweight, $r$, sufficient to raise the other end of the lever carrying the contacts. The contact-point $f$ is flexibly connected with the line $a'$, and the double contact-piece $i$ is flexibly connected with one end of a resistance, L, the other end of which is connected with the line $a$. This resistance may be made adjustable, if desired.

$g$ is a stationary contact-piece connected with the line $a^2$. This contact-piece forms a stop to the upward motion of the lever I, and ultimately to the levers E and G, through the intervention of the catches $q$ and arm $o$. $h$ is another contact-piece connected with one end of the lever F, which is pivoted at $k$, the other end of the lever being provided with a contact-piece, 2, which is flexibly connected with the line $a^3$. The lever F electrically connects the contacts $h$ and 2. 3 is another contact, which, in conjunction with the contact 2, connects the battery with the line $a^3$. The lever is weighted at $z$ to insure contact between 2 and 3 when contacts $h$ and $i$ are separated. By means of this mechanism both ends of the battery are disconnected from the charging-circuit when the lever I falls, because the contacts 2 and 3, as well as $f$ and $g$, are thereby separated.

O is a small magnet located in the charging-line $a\ a'$. It is provided with an armature attached to a lever, P, which is pivoted at $s$. The whole lever may be of iron and the separate armature dispensed with. When P is drawn up by the magnet O, it makes contact with a stop, $t$, and when P falls it is arrested by a stop, $u$.

R is a magnet of high resistance arranged as a shunt around the whole or part of the battery B by means of the conductor $v^2\ v'\ v'$, the current flowing from the battery through conductors $v'\ v'$, stop $t$, lever P, conductor $v^2$, magnet R, and conductor $v^2$ to the other end of the battery. The magnet R is provided with an armature-lever, S, pivoted at $w$. When the lever S is raised by the magnet R, it makes contact with a stop, $x$, (which may be made adjustable,) which stop is connected with the line $a^4$.

$y$ is an adjustable stop limiting the fall of the lever S.

The diagram just explained shows the various movable parts of the apparatus in the positions which they occupy while the generator A is charging the battery B. The current passes from the generator through the line $a$, magnet O, line $a'$, contacts $f\ g$, line $a^2$, battery B, line $a^3$, magnet C, line $a^4$, and through any other apparatus there may be in the working-circuit back to the generator. The magnets O and C, being energized by the current, will retain their armatures in the positions shown.

While the battery B is charging, the difference of electrical potential between its ends, or between any two points of the battery, remains nearly constant; but when the battery becomes fully charged free gases are evolved from its elements, and the difference of electrical potential between any two parts of the battery at once increases materially. The number of elements of the battery B, working the shunt-magnet R, and the distance of the armature S from the poles of the said magnet are so adjusted that while the battery B is being charged the magnet R will not be sufficiently energized to raise its armature S, while at the same time this adjustment is such that when the potential of the battery B rises at the completion of the process of charging the increased current thereby shunted through the magnet R shall enable the latter to raise its armature. This adjustment may also be effected through the agency of an adjustable weight (not shown) attached to the armature or armature-lever S. When the armature-lever S rises and makes contact with the stop $x$, the magnet C will be short-circuited, because the current from the line $a^3$ may now pass through the lever S and stop $x$ to line $a^4$. Thus the magnet C is paralyzed sufficiently to allow the lever G to drop. This in turn allows the lever E to fall and the contact-point $e$ to make contact with the conductor $i\ i$. Thus the whole or a part of the current from the line $a'$ is shunted from the battery B through the resistance L. The continued fall of the lever E, carrying with it the lever I, next breaks contact between the points $f\ g$, and thus disconnects the battery B from the line $a'$ and leaves the whole current from the latter in the resistance L. Finally, the contact-piece $i\ i$ makes contact with the contact-piece $h$ on the end of the lever F, thus short-circuiting the resistance L through the lever or conductor F. When the contact-piece $i\ i$ engages the contact-piece $h$, the contact-piece 2 on the opposite end of the lever is separated from the contact-piece 3, and thus both ends of the battery are disconnected from the charging line or circuit, and the latter is short-circuited around the battery. When a secondary battery discharges its current through a resistance sufficient to prevent a too rapid discharge, the electro-motive force of the battery remains nearly constant until its charge is nearly exhausted, after which the electro-motive force falls rapidly; hence by suitably adjusting the minimum distance of the armature S from its magnet by means of the adjustable contact-stop $x$ the armature S will fall when the electro-motive force of the battery B is reduced toward the close of the process of discharging. This will allow the magnet C to be energized if current is acting in the line $a\ a'$, &c., and the lever G will be raised, and with it the levers E, I, and F, thus throwing the battery B into the charging-circuit. If current is not acting in the circuit $a\ a'$, &c., then the magnet C will still be left ready to act when the charging-current again starts; but there are many objections to letting the battery B become nearly or quite discharged before recharging, one of which is that should the battery become exhausted while the line $a\ a'$, &c., is not supplied with current the battery will for the time become useless. To avoid these difficulties, I use the magnet O, through the agency of which, when energized by the charging-current, the shunt-circuit through the magnet R is established and maintained; but when the charging-current stops the armature-lever P falls, the shunt-circuit through R is opened, the armature-lever S falls, and the short-circuit around the magnet C is opened, leaving the latter ready to act when the charging-current again starts, and all of this irrespective of any particular condition of the battery B. Again, the opening of the shunt-circuit while the charging-current is not acting prevents any unnecessary waste of current through the shunt.

Let us now follow the operations which take place when the charging-current starts and the levers G, E, I, and F are at their lowest points. Matters have been so adjusted by means of the adjustable weight $m$ or the adjustable stop $n$, or both, that the lever G will not respond to the attraction of the magnet C until the charging-current, which excites the magnet, has reached a certain strength, which is approximately its normal strength. Before this point is reached, however, the current may have been for some time charging my other batteries, as hereinbefore explained. When the proper current strength is reached, the lever G rises and presently engages the arm $o$, attached to the lever E. By this time the armature $c$ has approached nearer to its magnet, whose attraction has thus become sufficient to carry upward not only the lever G, but also the lever E, which is finally stopped by the contacts $f\ g$ coming together. It will be noticed that the weight of the lever E is available to maintain a good contact between the points $e\ i\ i\ h$ until the instant of their positive separation. The reason for employing the independent lever G is now apparent. If the magnet C were made to act directly on the lever E, then the contacts $e\ i\ i\ h$ might for long periods be almost entirely relieved from the weight of the lever, whereby these contacts would be liable to destruction by burning. When the lever E begins to rise, the contact ends of the levers I and F follow, owing to the counter-weights $r$ and $z$. Thus the contacts $e\ i$ and $i\ h$ are preserved until the contacts 2 and 3 are closed. The levers E and I continue to rise, the contacts $e\ i$ being preserved, while the contacts $i\ h$ are opened, which operation throws the resistance L into the charging-circuit. Immediately thereafter the contact-points $f\ g$ come together, arresting further movement of the lever I and throwing the battery B into the charging-circuit. The lever E, continuing to move upward, separates the contact-points $e\ i$ and opens the resistance L, thus throwing all of the charging-current into the battery B. Finally, upward movement of the lever E is arrested by the catches $q$, and the strong attraction of the magnet C for its armature is then exerted in maintaining a good contact between the points $f\ g$, through which all of the charging-current now passes.

I prefer to make the contact points or pieces $e\ f\ g\ h$, &c., of carbon, such as is used in electric-arc lighting.

Fig. 2 of the drawings illustrates a system wherein a current-generator, A, charging circuit or line $a\ a$, automatic current-controlling devices K, secondary batteries B, and electro-receptive devices D are associated and combined, as has been hereinbefore described.

Fig. 3 shows a combination or compound arrangement of the magnets O and R, Fig. 1, wherein the helix of the magnet O is combined with that of the magnet R, the core of the latter being common to both helices. The electrical connections are so made that the main or charging current and the shunt-current circulate in the same direction around the common core, and thereby act jointly in magnetizing the latter and attracting the armature-lever S. The main current remaining constant, increase of current in the shunt-circuit, due to rise of potential in the battery at the completion of the charge, will enable the magnet to raise its armature and produce the results already described in connection with Fig. 1. When, however, the charging-current stops, the magnet R will be so weakened as to drop its armature the same as when the shunt-circuit was opened by the fall of the armature P in Fig. 1.

In Letters Patent No. 281,175, granted to me July 10, 1883, I have therein set forth and claimed devices for automatically switching a secondary battery into and out of the charging-circuit whether one or both ends of the battery are connected with and disconnected from the charging-circuit, and this is also true of the subject-matter embraced in Division C of original application, designated as "Case U." In Division A of Case U only one end of the battery is shown and described as being adapted to be connected with and disconnected from the charging-circuit. In this application, which, for the sake of convenience, I designate as "Division B of Case U," filed June 19, 1882, I make no claim to the subject-matter shown, described, and claimed in said patent or divisional applications, but restrict myself to the improvement wherein both ends of the battery are automatically connected with and disconnected from the charging-circuit.

Having fully described my invention, what I claim as new, and desire to secure by Letters Patent, is—

1. The combination, with an electric generator, a main or charging circuit, and a secondary battery, of switch mechanism constructed to connect and disconnect the opposite ends of the battery and the charging-circuit, and electro-magnets included in the charging-circuit and adapted to actuate the switch mechanism and automatically connect the opposite ends of the battery with the charging-circuit when the charging-current has approximately reached its normal strength, (and not until then,) substantially as set forth.

2. The combination, with an electric generator, a main or charging circuit, and a secondary battery, of switch mechanism constructed to connect and disconnect the opposite ends of the battery and the charging-circuit, a circuit around the battery adapted to be opened and closed, and electro-magnets included in the charging-circuit and circuit including the battery, and arranged to actuate the switch mechanism and automatically disconnect the opposite ends of the battery from the charging-circuit and simultaneously close the charging-circuit around the battery, substantially as set forth.

3. The combination, with an electrical generator, a main or charging circuit, and a secondary battery, of switch mechanism constructed to connect and disconnect the opposite ends of the battery and the charging-circuit, and electro-magnets included in the charging-circuit and circuit including the battery and arranged to be actuated by the rise of electrical potential of the secondary battery attending the completion of its charge and operate the switch mechanism and automatically disconnect the opposite ends of the battery from the charging-circuit and close the latter around the battery, substantially as set forth.

4. The combination, with an electrical generator, a main or charging circuit, a secondary battery, and translating devices included in the discharging-circuit of the secondary battery, and a circuit around the battery adapted to be opened and closed by a switch, of switch mechanism constructed to disconnect the opposite ends of the battery from the charging-circuit and closing the latter around the battery and electro-magnets included in the charging-circuit and circuit including the battery connected with and adapted to automatically actuate said switch mechanism, substantially as set forth.

5. The combination, with an electrical generator, a main or charging circuit, a secondary battery, and translating devices included in the discharging-circuit of the secondary battery, and a circuit around the battery adapted to be opened and closed by a switch, of switch mechanism included in the charging-circuit and circuit including the battery and arranged to disconnect the opposite ends of the battery from the charging-circuit and simultaneously close the latter around the battery, said switch mechanism being constructed to allow the working-circuit to be energized either by the generator or secondary battery, or both, and electro-magnets connected with and adapted to automatically actuate said switch mechanism, substantially as set forth.

6. The combination, with an electrical generator, a main or charging circuit, and a secondary battery, of switch mechanism for connecting the opposite ends of the battery with the charging-circuit, and electro-magnets included in the charging-circuit and circuit including the battery and arranged to actuate the switch mechanism and automatically connect the opposite ends of the battery with the charging-circuit when the electrical potential of said battery shall have reached a predetermined minimum, substantially as set forth.

7. The combination, with an electrical generator, a main or charging circuit, and a secondary battery, of switch mechanism constructed and arranged to connect and disconnect the opposite ends of the battery and the charging-circuit and a circuit around the battery adapted to be opened and closed by a switch, and electro-magnets included in the charging circuit and circuit including the battery and arranged to actuate the switch mechanism and open the charging-circuit around the battery and to connect the opposite ends of the latter with the charging-circuit when the electrical potential of said battery shall have reached a predetermined minimum, substantially as set forth.

8. The combination, with an electrical generator, a main or charging-circuit, a secondary battery, and translating devices included in the discharging or working circuit of the secondary battery, of switch mechanism constructed and adapted to connect the opposite ends of the battery and charging-circuit, and thereby switch the battery and its discharging or working circuit into the main or charging circuit, and electro-magnets included in the charging-circuit and circuit including the battery and arranged to actuate said switch when the electrical potential of the battery shall have reached a predetermined minimum and automatically switch the battery and its working-circuit into the main or charging circuit, substantially as set forth.

9. The combination, with an electrical generator, a main or charging circuit, a secondary battery, and a resistance included in a branch circuit adapted to be closed around the battery, of switch mechanism and electro-magnets for operating the same, the parts being constructed and arranged to automatically switch a part of the charging-current around the battery, and then divert the entire charging-current around the battery and disconnect the opposite ends of the battery from the main or charging circuit, substantially as set forth.

10. The combination, with an electrical generator, a main or charging circuit, a secondary battery, and an open resistance branch circuit around the battery, of switch mechanism and electro-magnets for actuating the same, the parts being constructed and arranged to be actuated by the fall of electrical potential of the battery for automatically connecting the opposite ends of the battery with the main or charging circuit and switching part of the charging-current through the battery and part around the battery, and then breaking the short circuit around the battery and diverting the entire charging-current through the battery, substantially as set forth.

11. A system embracing an electrical current-generator, a main or charging circuit, two or more secondary batteries or groups of secondary batteries, and switch mechanism and electro-magnets connected with each of said batteries or group of batteries, said switch mechanism and electro-magnets, the latter included in the charging-circuit and circuit including the battery and arranged to automatically and independently connect the opposite ends of its battery or group of batteries with the charging-circuit when the charging-current has approximately reached its normal strength, substantially as set forth.

12. A system embracing an electrical current-generating apparatus, a main or charging circuit, two or more secondary batteries or group of secondary batteries, and switch mechanism and electro-magnets associated with each battery or group of batteries, said switch mechanism and electro-magnets being included in the charging-circuit and circuit including the battery and arranged to automatically and independently disconnect the opposite ends of each battery or group of batteries from the charging-circuit by the rise of electrical potential of said battery or group of batteries which attends the near completion of the charging process, substantially as set forth.

13. A system embracing an electrical current-generator, a main or charging circuit, two or more secondary batteries or groups of secondary batteries, and switch mechanism and electro-magnets associated with each battery or group of batteries, said switch mechanism and electro-magnet (the latter included in the charging-circuit and circuit including each battery or groups of batteries) being constructed and arranged to automatically and independently connect the opposite ends of each battery or group of batteries with the charging-circuit by the fall of electrical potential of said battery or group of batteries which attends the near exhaustion of its charge, substantially as set forth.

In testimony whereof I sign this specification, in the presence of two witnesses, this 18th day of May, 1883.

CHARLES F. BRUSH.

Witnesses:
L. L. LEGGETT,
ALBERT E. LYNCH.